Patented June 17, 1952

2,600,414

UNITED STATES PATENT OFFICE 2,600,414

VULCANIZATION OF ACRYLIC RESINS

William C. Mast, Philadelphia, Chessie E. Rehberg, Glenside, and Charles H. Fisher, Abington, Pa., assignors to the United States of America as represented by the Secretary of Agriculture No Drawing. Application August 22, 1947, Serial No. 770,180

2 Claims. (Cl. 260—63)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation-in-part of our application Serial No. 595,870, filed May 25, 1945, which has matured into Patent No. 2,492,170.

This invention relates to synthetic rubbers prepared from alkyl acrylate polymers and copolymers.

In accordance with current practice, the term "synthetic rubber" is used herein to designate a synthetic rubberlike material which, at ordinary temperature, can be stretched to at least twice its initial length, and will forcibly retract to substantially its original dimensions within a reasonable time thereafter.

It is known that synthetic rubbers can be produced by vulcanization of certain polymeric substances. As in the treatment of natural rubber, vulcanization of these synthetic polymers is a process whereby a thermoplastic, solvent-soluble substance of limited elasticity and high plastic flow is converted to a highly elastic, insoluble material, substantially free of plastic flow properties, and relatively insensitive to temperature variations.

Heretofore the presence of olefinic unsaturation in the polymeric chain was considered necessary to render the polymeric material susceptible of vulcanization. Thus a number of synthetic rubbers are produced by vulcanization of unsaturated polymers formed either from butadiene and related dienes or obtained by copolymerization of monomer mixtures comprising at least one diene component.

It is known that the polymers of methyl acrylate, ethyl acrylate and of other normal alkyl acrylates are soft and flexible. Furthermore, it is known that useful flexible materials can be made by blending alkyl acrylate polymers with other materials or by incorporating fillers and pigments into them. The resulting products, however, lack some of the desirable characteristics found in natural and in certain synthetic rubbers.

Acrylic polymers and copolymers having olefinic unsaturation, for instance polymeric allyl acrylate, copolymers of acrylic esters with vinyl-beta-methyl crotonate, or with butadiene and related dienes yield rubberlike materials. As far as is known, however, synthetic rubbers have not been produced hitherto from saturated acrylic polymers and copolymers.

A "synthetic rubber," as previously defined, is not produced when alkyl acrylate polymers, such as polymethyl acrylate and polyethyl acrylate are heated with sulfur. We have attempted vulcanization by heating such polymers containing sulfur and mixtures of such polymers, sulfur, carbon black, and some of the standard accelerators used in the vulcanization of natural rubber, without successful results, and the products so obtained lack many of the desirable properties found in vulcanized rubber and vulcanized synthetic rubbers.

An object of this invention, accordingly, is to produce vulcanized alkyl acrylate polymers having enhanced rubberlike properties and capable of being used in place of rubber. Another object is to prepare alkyl acrylate polymers, which can be compounded and milled on standard rubber rolls and equipment and cured or vulcanized in standard rubber molds to give vulcanized rubberlike products. A further object is to produce synthetic rubbers which have greater resistance to light, oils, oxidation, aging, and heat, than have natural rubber and some of the previously described synthetic rubbers. A further object is to provide synthetic rubbers which can be made from carbohydrates, an abundant and reproducible raw material. A still further object is to provide methods for copolymerizing methyl acrylate, ethyl acrylate, and similar alkyl acrylates with various quantities of other monomers including substituted alkyl acrylates, to obtain essentially saturated copolymers which can be vulcanized by certain suitable agents which we have found to be effective. Other objects and advantages of the invention will appear hereinafter.

We have found that synthetic rubbers and rubberlike materials can be made by copolymerizing a mixture of from 80 to 98 percent, by weight, of an alkyl acrylate, which includes alkyl acrylates and alkacrylates such as methyl, ethyl, propyl, butyl, octyl and other alkyl acrylates and methacrylates, with at least 2 percent of either (a) monomers having only one polymerizable double bond, such as aryl acrylates or methacrylates, as for example phenyl and benzyl acrylate, phenyl methacrylate and so forth, or (b) monomers having only one polymerizable double bond and in addition containing at least one halogen atom or a cyano or a ketone group. Compounds of this type which are preferred are methyl vinyl ketone, chloroallyl alcohol, such as 2-chloroallyl alcohol, and a chlorine-substituted propene containing not more than two chlorine atoms, such as 1-chloropropene, 2-chloropropene, and 2,3-dichloropropene. Other compounds of this type which may be used include for example, chloroethyl acrylate, cyanoethyl acrylate, methyl chloracrylate, vinyl bromopropionate, bromopropyl methacrylate, bromoethyl acrylate, 3-chloropropyl acrylate, 1,3-dichloro-2-propyl acrylate, bromopropyl acrylate, 2-chloroallyl lactate, vinylidenechloride, vinyl chloride, allyl chloride, 2-chloroallyl pelargonate, 2,3-dichloropropyl acrylate, di-n-butyl chloromaleate, alpha-chloroacrylonitrile, alpha-chlorostyrene, beta-chloroethoxyethyl acrylate, chloromaleic anhydride, dimethyl chloromaleate, di-2-chloroethyl maleate, 2-chloroethyl-vinyl ether, and so forth. The resulting copolymers are then compounded with a vulcanizing agent and preferably with other compounding ingredients used in the vulcanization of natural rubber, and heated under conditions commonly utilized in the production of natural and synthetic rubber vulcanizates. The vulcanization process of this invention yields satisfactory results when applied to copolymers obtained by polymerization of monomer mixtures containing an alkyl acrylate and a halogen, cyano- or ketone-group-containing-comonomer, in the proportion, by weight, of from 80 to 98 percent of the acrylate to at least 2 percent, by weight, of the halogen, cyano- or ketone-group-containing comonomer.

Although olefinic unsaturation has usually been considered necessary for vulcanization, the copolymers described herein are essentially saturated, but are vulcanizable by the agents and techniques of the present invention. It is advantageous to vulcanize saturated copolymers, since cross-linkage usually occurs when unsaturated copolymers are made by polymerizing such monomers as butadiene, isoprene, allyl fumarate, divinylbenzene and the like.

Copolymerization can be effected by any method suitable for the production of alkyl acrylate copolymers. Emulsion polymerization is a convenient procedure for preparing the copolymers, but these can also be made by solution or mass polymerization. Polymerization can be achieved by the usual methods including the effect of photochemical action or heat polymerization. Although polymerization can be conducted without catalysts or initiators the addition of these greatly speeds up the reaction. The presence of known polymerization regulators such as dodecyl mercaptan, acrylonitrile, carbon tetrachloride, hexachloro ethane, trichloropropionitrile, or alkyl xanthogen disulfides like isopropyl xanthogen disulfide has a beneficial effect on the process, but vulcanizable copolymers suitable for the production of synthetic rubbers can be made without their use.

The polymerization catalysts or initiators suitable for use in the production of the copolymers of the present invention are, for example, oxidizing agents such as hydrogen peroxide, benzoyl peroxide, sodium perborate, ammonium persulfate, urea-peroxide, percarbonates and other similar substances commonly utilized to initiate or promote polymerization reactions.

When copolymerization is conducted in aqueous emulsion various emulsifying and dispersing agents can be used to effect dispersion of the monomers, improve the stability of the emulsion and reduce duration of the reaction. Suitable agents include: anion active compounds, for example sulfated compounds like sulfated oils such as sulfated castor oil; sulfated alcohols; or alkyl sulfates such as sodium tetradecyl sulfate; sulfonated compounds, like aliphatic sulfonates, for example, the sodium salt of sulfonated petroleum oil; sulfonates of aromatic compounds which may contain alkyl or other aliphatic side chains, for example, the sodium salt of alkyl phenoxyethyl sulfonate and of similar aryl-alkyl sulfonates; cation active compounds like cetyl dimethylbenzyl ammonium chloride and other well known emulsifying and dispersing agents used either singly or in combination in emulsion polymerization.

The polymerizations can be carried out for example in a round-bottomed three-necked, Pyrex glass flask fitted with a thermometer well, a reflux condenser and a stirrer. The monomer mixture is added to water and an emulsifying agent in the flask, stirred, and heated to about refluxing temperature. The desired amount of catalyst is then added either all at once or by increments. Heating is applied, if necessary, to maintain gentle refluxing, and the course of the polymerization is followed by noting changes in the refluxing temperature. When refluxing ceases in spite of continued heating (usually at about 90–95° C.) the polymerization is complete. The emulsion can then be steam distilled to remove monomers and other volatile materials, is coagulated by addition of a dilute solution of sodium chloride, and the polymeric material washed with water and dried.

Data on some polymerizations are given hereinafter in Tables I, X, and XIII.

The alkyl acrylate copolymers so obtained can be converted to synthetic rubbers by the action of vulcanizing agents, preferably used in conjunction with conventional rubber compounding ingredients, under conditions essentially analogous to those utilized in the production of natural and synthetic rubber vulcanizates.

The vulcanizing agents suitable for use in effecting the vulcanization of the alkyl acrylate copolymers of the present invention include the following classes of vulcanizing agents utilized in the vulcanization of natural rubber and of certain synthetic rubbers.

1. Sulfur, preferably used in conjunction with at least one vulcanization accelerator, that is a substance known to promote the sulfur vulcanization of natural rubber. Suitable accelerators include, for example, the following types of rubber vulcanization accelerators: Aldehyde-amines like the butyraldehyde-aniline, formaldehyde-monoethylamine and heptaldehyde-aniline condensation products; guanidines like diphenylguanidine; thiazoles such as mercaptobenzothiazole, benzothiazyl disulfide, zinc benzothiazyl sulfide, dinitrophenyl benzothiazyl sulfide admixed with diphenylguanidine, cupric salt of mercaptobenzothiazole, thiuram sulfides like tetramethyl thiuram monosulfide and disulfide, or di-N-pentamethylene thiuram tetrasulfide; dithiocarbamates such as N-pentamethylene ammonium pentamethylene dithiocarbamate, selenium diethyldithiocarbamate, zinc dimethyl- or zinc dibutyl dithiocarbamate, 2,4-dinitrophenyl dimethyl dithiocarbamate and cupric diethyldithiocarbamate, sodium salt of dibutyl dithiocarbamic acid and other rubber vulcanization accelerators like the reaction product of carbon bisulfide and methylene dipiperidine, alkyl phenol sulfide, etc.

2. Quinone derivatives described in U. S. Patent 2,170,191 such as quinone dioxime and quinone dioxime esters of aliphatic and aromatic acids, such as benzoquinone dioxime, which may be used in combination with suitable oxidizing agents, for example, red lead, or in the form of their oxidation products as exemplified by the vulcanizing agent comprising polymerized dinitrosobenzene as the active ingredient.

3. Dinitrobenzene used either singly or in combination with litharge.

4. Peroxides, such as benzoyl peroxide and so forth.

In addition to the above-listed natural rubber vulcanizing agents, the alkyl acrylate copolymers of the present invention are vulcanized by the action of amines and amine-condensation products, for example, triethylene tetramine or triethyl trimethylene triamine. When used as the sole vulcanizating agent these amines effect rapid vulcanization of the alkyl acrylate copolymers; where used in combination with natural rubber vulcanizing agents these amines or amine condensation products accelerate the curing process and have a beneficial effect on the resulting vulcanizate.

Data on some vulcanization procedures are shown in Tables II, IV, VI, VIII, XI, XIV, XVI and XVII, and the properties of the resulting vulcanizates are shown in Tables III, V, VII, IX, XII, XV, XVII, and XIX.

The compounding ingredients listed in Tables II, IV, VI, VIII, XI, XIV, XVI, and XVIII include in addition to the aforementioned vulcanizing agents and accelerators other compounding ingredients commonly utilized in the production of natural and synthetic rubber vulcanizates to alter the chemical and/or physical properties of the finished product. Thus, for example, carbon black is used as a reinforcing agent; zinc oxide and in some instances litharge or magnesia may be added to render certain accelerators fully effective. Stearic acid and similar softening agents are used as processing aids.

In preparing the vulcanizates the compounding ingredients were milled into the copolymers on a standard rubber mill which had steam-heated rolls. The copolymers were tacky and required little or no break-down before forming a rolling bank. Large amounts of carbon black could be milled into the copolymers. The compounded mixtures were cured and tested with equipment and techniques used in the rubber and the synthetic rubber industries. The vulvanized products (vulcanizates) were soft, flexible, elastic, rubberlike in appearance and feel, insoluble in hydrocarbon solvents and water, and resistant to oxygen, aging and heat.

The practice of the invention is not limited to the agents shown in the following tables. For example many emulsifiers can be used instead of alkyl sodium sulfate, and various peroxides and per compounds can be used to initiate the polymerizations.

Other esters of acrylic acid in addition to those shown in the foregoing mentioned tables, which were used to prepare essentially saturated and vulcanizable alkyl acrylate copolymers include, methyl acrylate, propyl acrylate, butyl acrylate and other alkyl acrylates.

Vulcanizates having similar properties were produced by preparing the corresponding copolymers and subjecting them to vulcanization using procedures similar to those shown in the following tables.

The discovery that halogen, cyano, ketone ($-CH_2-CO-$), and similar groups can be used instead of olefinic linkages to facilitate vulcanization has broad application. For example, bromine atoms in a copolymer chain also act as active centers in vulcanization processes.

Reinforcing agents, fillers, accelerators and similar rubber compounding ingredients can be added to the copolymers on a rubber mill or any suitable mixer, or the ingredients can be incorporated in the emulsion or solution of the copolymers. Solutions of the copolymers containing vulcanizing agents, accelerators and so on, are useful as adhesives and rubber cements.

This invention is a valuable advance in the art as it extends the known range of synthetic rubbers, and provides new substitutes for rubber which have in some respects advantages over natural rubber products.

Furthermore, the synthetic rubbers described herein can be made almost entirely (through lactic acid as an intermediate) from carbohydrates, an abundant, domestic, and reproducible raw material.

Although in the specific examples illustrative of preferred embodiments of our invention, synthetic rubbers are produced by conducting vulcanization in the presence of vulcanizing agents used in conjunction with vulcanization accelerators or promoters and conventional compounding ingredients of natural and synthetic rubber vulcanizates, such synthetic rubbers can be obtained in accordance with the method of our invention by subjecting the copolymers to vulcanization in the presence of only a vulcanizing agent.

In the present specification and claims the term "vulcanizing agent" is meant to include triethylene tetramine, triethyl trimethylene triamine and equivalent amines and amine condensation products, as well as known rubber vulcanizing agents of the four types listed herein.

The following examples shown in tabulated form are illustrative of the invention. In all of these examples, the physical properties of the final products were determined by the procedure of the A. S. T. M. Specification D-412-41.

TABLE I
*Preparation of acrylic resins*

| Example No. | Ethyl Acrylate, g. | Comonomer | Amount | Acrylonitrile, g. | Alkyl Sodium Sulfate (Emulsifier), g. | Ammonium Persulfate (Catalyst), g. | Water, ml. | Temp., °C. | Time, hrs. | Yield of Copolymer, Per Cent |
|---|---|---|---|---|---|---|---|---|---|---|
| 1 | 142.5 | Benzyl Acrylate | 7.5 g. | 0.0 | 4.0 | 0.03 | 250 | 78–92 | 2 | 91.0 |
| 2 | 142.5 | | | 7.5 | 4.0 | 0.02 | 250 | 78–92 | 4¼ | 88.5 |
| 3 | 142.5 | Beta-Chloroethyl Acrylate | 7.5 g. | 0.0 | 4.0 | 0.015 | 300 | 78–92 | 1½ | 90.0 |
| 4 | 95.0 | Phenyl Acrylate | 5.0 g. | 0.0 | 3.0 | 0.10 | 150 | 75–92 | ⅚ | 90.0 |
| 5 | 142.5 | Methyl Carbitol Acrylate | 7.5 g. | 0.0 | 4.0 | 0.03 | 300 | 80–92 | 1⅓ | 93.5 |
| 6 | 142.5 | Beta-Cyanoethyl Acrylate | 7.5 g. | 0.0 | 4.0 | 0.03 | 300 | 80–92 | 1⅔ | 91.0 |
| 7 | 142.5 | 2-Methyl-2-Nitro-1-Propyl Acrylate | 7.5 g. | 0.0 | 4.0 | 0.02 | 300 | 77–92 | 1⅔ | 91.0 |
| 8 | 135.0 | Beta-Chloroethyl Acrylate | 15.0 g. | 0.0 | 4.0 | 0.015 | 300 | 82–91 | 2 | 88.0 |
| 9 | 89.0 | Beta-Chloroethyl Acrylate | 5.0 g. | 6.0 | 3.0 | 0.12 | 150 | 78–91 | 1¾ | 92.0 |
| 10 | 142.5 | | | 7.5 | 4.0 | 0.045 | 300 | 78–91 | 4½ | 90.5 |
| 11 | | n-Butyl Acrylate | 150 ml. | | 4.0 | 0.05 | 250 | 85–93 | 3 | 89.0 |

TABLE II
*Vulcanization of copolymers of Table I*

| Example No. | Red lead | Zinc oxide | Stearic acid | Quinone dioxime | Carbon black | Iron oxide | 23% Benzoyl peroxide | Mercaptobenzothiazole | Tetramethylthiuram disulfide | Vulcanization at 298° F. (Min.) |
|---|---|---|---|---|---|---|---|---|---|---|
| 1 | 10 | 5 | 3 | 2 | 30 | | | | | 240 |
|   |    |   |   |   |    | 150 | 5 | | | 120 |
| 2 | 10 | 5 | 3 | 2 | 30 | | | | | 240 |
|   |    |   |   |   |    | 150 | 5 | | | 180 |
|   |    | 10 | 2 | | 30 | | | .5 | 1 | 240 |
| 3 | 10 | 5 | 3 | 2 | 30 | | | | | 120 |
|   |    |   |   |   |    | 150 | 5 | | | 240 |
|   |    | 10 | 2 | | 30 | | | .5 | 1 | 240 |
| 4 | 10 | 5 | 3 | 2 | 30 | | | | | 240 |
|   |    |   |   |   |    | 150 | 5 | | | 20 |
|   |    | 10 | 2 | | 30 | | | .5 | 1 | 240 |
| 5 | 10 | 5 | 3 | 2 | 30 | | | | | 240 |
| 6 | 10 | 5 | 3 | 2 | 30 | | | | | 120 |
|   |    |   |   |   |    | 150 | 5 | | | 80 |
|   |    | 10 | 2 | | 30 | | | .5 | 1 | 120 |
| 7 | 10 | 5 | 3 | 2 | 30 | | | | | 120 |
|   |    |   |   |   |    | 150 | 5 | | | 180 |
| 8 | 10 | 5 | 3 | 2 | 30 | | | | | 180 |
|   |    |   |   |   |    | 150 | 5 | | | 120 |
|   |    | 10 | 2 | | 30 | | | .5 | 1 | 180 |
| 9 | 10 | 5 | 3 | 2 | 30 | | | | | 240 |
|   |    |   |   |   |    | 150 | 5 | | | 180 |
| 10 | 10 | 5 | 3 | 2 | 30 | | | | | 240 |
|   |    |   |   |   |    | 150 | 5 | | | 120 |
| 11 | 10 | 5 | 3 | 2 | 30 | | | | | 60 |

TABLE III
*Physical properties of vulcanizates of Table II*

| Example No. | Tensile strength, lbs./sq. in. | Elongation at break, Per Cent | Shore A Hardness |
|---|---|---|---|
| 1 | 1,410 | 480 | 65 |
|   | 640 | 490 | 45 |
| 2 | 1,320 | 260 | 72 |
|   | 1,000 | 420 | 53 |
|   | 830 | 1,040 | 50 |
| 3 | 1,610 | 400 | 64 |
|   | 870 | 500 | 45 |
|   | 1,280 | 880 | 46 |
| 4 | 960 | 180 | 75 |
|   | 570 | 480 | 42 |
|   | 790 | 780 | 50 |
| 5 | 1,090 | 340 | 55 |
| 6 | 1,670 | 450 | 65 |
|   | 510 | 440 | 45 |
|   | 1,090 | 860 | 48 |
| 7 | 470 | 410 | 31 |
|   | 760 | 440 | 41 |
| 8 | 1,350 | 460 | 56 |
|   | 1,050 | 280 | 50 |
|   | 1,220 | 720 | 42 |
| 9 | 1,180 | 470 | 56 |
|   | 820 | 560 | 45 |
| 10 | 1,420 | 340 | 70 |
|   | 870 | 520 | 52 |
| 11 | 780 | 640 | 47 |

TABLE IV

*Vulcanization of ethyl acrylate-chloropropyl acrylate copolymers*

| Example No. | Compounding formula in parts per 100 parts of copolymers ||||||||||||||||| Vulcanization ||
|---|---|---|---|---|---|---|---|---|---|---|---|---|---|---|---|---|---|---|
| | A | B | C | D | E | F | G | H | I | J | K | L | M | N | O | P | Time, min. | Temp., °F. |
| 12 | 0.5 | 10 | 2 | 2 | 30 | 1 | | | | | | | | | | | 180 | 213 |
| 13 | 0.5 | 10 | 2 | 2 | 50 | 1 | 5 | | | | | | | | | | 240 | 298 |
| 14 | 0.5 | 10 | 2 | 2 | 50 | 1 | 10 | | | | | | | | | | 360 | 298 |
| 15 | 0.5 | 10 | 2 | 2 | 75 | 1 | 20 | | | | | | | | | | 240 | 298 |
| 16 | | 5 | 3 | | 30 | | | 10 | 2 | | | | | | | | 60 | 298 |
| 17 | | 10 | | 2 | 30 | 1 | | | | 0.5 | | | | | | | 180 | 298 |
| 18 | 0.5 | 10 | | 2 | 30 | | | | | | 1 | | | | | | 300 | 298 |
| 19 | | 10 | | 2 | 30 | | | | | 0.5 | 1 | | | | | | 300 | 298 |
| 20 | | 10 | 2 | | 30 | | | | | 0.5 | | | | | | | 300 | 298 |
| 21 | 0.38 | 10 | 2 | | 30 | .75 | | | | | | 1 | | | | | 240 | 298 |
| 22 | | | 10 | | 30 | | | | | | | | 3 | 4 | 10 | | 360 | 298 |
| 23 | 0.5 | 10 | 2 | 2 | | 1 | | | | | | | | | | 80 | 240 | 298 |

NOTE 1.—The alphabetical characters shown under the above compounding formula have the following significance:
A—Purified mercaptobenzothiazole.
B—Zinc oxide.
C—Stearic acid.
D—Sulfur.
E—Carbon black.
F—Tetramethylthiuram disulfide.
G—An ester type plasticizer.
H—Red lead.
I—Quinone dioxime.
J—Cupric salt of mercaptobenzothiazole.
K—Cupric diethyldithiocarbamate.
L—Polyac (polymerized di-nitrosobenzene).
M—An organic polysulfide (polyethylene polysulfide).
N—p-Dinitrobenzene.
O—Litharge.
P—Finely ground calcium carbonate.

NOTE 2.—The copolymer was made from 95% ethyl acrylate and 5% 3-chloropropyl acrylate.
NOTE 3.—The compounded mixtures were cured in 4 x 4 x 0.23 inch molds.
NOTE 4.—The copolymer used in the above vulcanizations was prepared from 200 g. of gamma-chloropropyl acrylate, 4,000 ml. of ethyl acrylate, 5,000 ml. of water, 80 g. of sodium alkyl sulfate, 40 g. of the sodium salt of aryl alkyl polyether sulfonate, and 0.035 g. of ammonium persulfate. The polymerization was carried out at about from 82° to 90° C. and was finished in about 3 hours.
NOTE 5.—The ester type plasticizer mentioned under G is a glycol di-octoate.

TABLE V

*Physical properties of vulcanizates of Table IV*

| Example No. | Tensile Strength, lbs./sq. in. | Modulus at 600 Per Cent | Ultimate Elongation, Per Cent | Shore A Hardness | Permanent Set at Break, Per Cent | Permanent Set (10 min.), Per Cent | Tensile Product |
|---|---|---|---|---|---|---|---|
| 12 | 1,210 | 830 | 790 | 48 | 13.7 | 21.4 | 956 |
| 13 | 1,170 | 1,080 | 690 | 46 | | | 806 |
| 14 | 1,190 | 730 | 690 | 40 | | | 822 |
| 15 | 880 | 490 | 880 | 40 | | | 774 |
| 16 | 1,530 | 1,450 | 650 | 55 | 25.5 | 34.9 | 994 |
| 17 | 1,490 | 660 | 940 | 40 | | | 1,400 |
| 18 | 1,370 | 1,070 | 740 | 43 | | | 1,014 |
| 19 | 1,440 | 990 | 790 | 43 | | | 1,133 |
| 20 | 1,460 | 1,180 | 700 | 41 | | | 1,022 |
| 21 | 980 | 370 | 920 | 38 | | | 902 |
| 22 | 1,340 | | 560 | 35 | | | 750 |
| 23 | 1,280 | 1,240 | 610 | 47 | | | 780 |

TABLE VI

*Vulcanization of halogen-containing acrylic resins*

| Example No. | Monomers | grams | Compounding Formula in parts per 100 parts of Copolymer [1] |||||||||||| Vulcanization ||
|---|---|---|---|---|---|---|---|---|---|---|---|---|---|---|---|
| | | | A | B | C | D | E | F | G | H | I | J | K | L | Time, min. | Temp., °F. |
| 24 | Ethyl Acrylate | 190 | .5 | 10 | 2 | 2 | 30 | 1 | | | | | | | 120 | 298 |
| 25 | 2-Bromoethyl Acrylate | 10 | | 10 | 3 | | 30 | | 10 | 2 | | | | | 60 | 298 |
| 26 | 3-Chloropropyl Acrylate | 100 | .5 | 10 | 2 | 2 | 30 | 1 | | | | | | | 60 | 298 |
| 27 | {Ethyl Acrylate | 180 | .5 | 10 | 2 | 2 | 30 | 1 | | | | | | | 180 | 298 |
| | {3-Chloropropyl Acrylate | 10 | | | | | | | | | | | | | | |
| 28 | Acrylonitrile | 10 | | 10 | 3 | | 30 | | 10 | 2 | | | | | 120 | 298 |
| 29 | {n-Octyl Acrylate | 90 | | 10 | 3 | | 30 | | 10 | 2 | 60 | | | | 240 | 298 |
| | {3-Chloropropyl Acrylate | 10 | | | | | | | | | | | | | | |
| 30 | {n-Butyl Acrylate | 40 | .5 | 10 | 2 | 2 | 30 | 1 | | | | | | | 180 | 298 |
| | {Ethyl Acrylate | 140 | | | | | | | | | | | | | | |
| 31 | 3-Chloropropyl Acrylate | 20 | | 10 | 3 | | 30 | | 10 | 2 | | | | | 60 | 298 |
| 32 | {Ethyl Acrylate | 95 | | 10 | 2 | | 30 | | | | | 2 | | | 180 | 298 |
| | {3-Chloropropyl Acrylate | 5 | | | | | | | | | | | | | | |
| 33 | }Ethyl Acrylate | 90 | | 10 | 3 | | 30 | | 10 | 2 | | .5 | | | 30 | 298 |
| 34 | | | | 10 | 2 | | 30 | | | | | | 1 | 10 | 30 | 298 |
| 35 | }3-Chloropropyl Acrylate | 10 | .5 | 5 | 2 | 2 | 30 | 1 | | | | | .5 | 5 | 60 | 298 |
| 36 | | | .5 | 10 | 2 | 2 | 30 | 1 | | | | 1 | | | 15 | 298 |

[1] The alphabetical characters shown hereunder have the following significance:
A—Purified mercaptobenzothiazole.
B—Zinc oxide.
C—Stearic acid.
D—Sulfur.
E—Carbon black.
F—Tetramethylthiuram disulfide.
G—Red lead.
H—Quinone dioxime.
I—Special furnace reinforcing black.
J—Polyac.
K—Triethylene tetramine.
L—Calcined magnesia.

TABLE VII
*Physical properties of vulcanizates of Table VI*

| Example No. | Tensile strength, lbs./sq. in. | Ultimate Elongation, per cent | Shore A Hardness |
|---|---|---|---|
| 24 | 1,390 | 860 | 43 |
| 25 | 1,510 | 520 | 48 |
| 26 | 890 | 350 | 50 |
| 27 | 1,420 | 600 | 53 |
| 28 | 1,550 | 460 | 61 |
| 29 | 940 | 170 | 88 |
| 30 | 1,330 | 650 | 46 |
| 31 | 1,380 | 470 | 58 |
| 32 | 1,540 | 770 | 46 |
| 33 | 1,350 | 700 | 47 |
| 34 | 1,420 | 620 | 43 |
| 35 | 1,270 | 730 | 47 |
| 36 | 1,460 | 830 | 42 |

TABLE IX
*Physical properties of vulcanizates of Table VIII*

| Example No. | Tensile strength, lbs./sq. in. | Ultimate Elongation, Per Cent | Shore A Hardness |
|---|---|---|---|
| 37 | 1,410 | 490 | 47 |
| 38 | 1,260 | 720 | 45 |
| 39 | 940 | 270 | 55 |
| 40 | 1,350 | 700 | 34 |
| 41 | 1,130 | 560 | 49 |
| 42 | 1,320 | 860 | 37 |
| 43 | 1,470 | 470 | 54 |
| 44 | 1,490 | 570 | 41 |
| 45 | 1,150 | 620 | 51 |
| 46 | 1,000 | 780 | 47 |
| 47 | 1,300 | 460 | 51 |
| 48 | 1,060 | 520 | 38 |
| 49 | 1,280 | 520 | 41 |
| 50 | 1,270 | 680 | 43 |
| 51 | 1,360 | 560 | 50 |
| 52 | 1,630 | 540 | 61 |

TABLE VIII
*Vulcanization of halogen-containing acrylic resins*

| Example No. | Monomers | Grams | Compounding Formula in Parts per 100 Parts of Copolymer [1] | | | | | | | | | | | | Vulcanization | |
|---|---|---|---|---|---|---|---|---|---|---|---|---|---|---|---|---|
| | | | A | B | C | D | E | F | G | H | I | J | K | L | Time, min. | Temp., °F. |
| 37 | 1,3-Dichloro-2-propyl Acrylate | 20 | | 10 | 3 | | 30 | | 10 | 2 | | | | | 120 | 298 |
| 38 | Ethyl Acrylate | 180 | .5 | 10 | 2 | 2 | 30 | 1 | | | | | | | 120 | 298 |
| 39 | 3-Bromopropyl Acrylate | 14 | | 10 | 3 | | 30 | | 10 | 2 | | | | | 30 | 298 |
| 40 | Ethyl Acrylate | 186 | .5 | 10 | 2 | 2 | 30 | 1 | | | | | | | 30 | 298 |
| 41 | {2-Chlorallyl Lactate / Ethyl Acrylate} | 10 / 190 | | 10 | 3 | | 30 | | 10 | 2 | | | | | 60 | 298 |
| 42 | {Chloropropyl Acrylate / Ethyl Acrylate} | 10 / 70 | .5 | 10 | 2 | 2 | 30 | 1 | | | | | | | 180 | 298 |
| 43 | n-Octyl Acrylate | 20 | | 10 | 3 | | 30 | | 10 | 2 | | | | | 120 | 298 |
| 44 | {Ethyl Acrylate / 3-Chloropropyl Acrylate} | 90 / 10 | | 10 | 2 | | 30 | 1 | | | | 2 | | | 60 | 320 |
| 45 | Ethyl Acrylate | 85 | .5 | 10 | 2 | 2 | 30 | 1 | | | | | 1 | 10 | 30 | 298 |
| 46 | Vinylidene Chloride | 15 | | 10 | 2 | | 30 | | | | | | 1 | 10 | 30 | 298 |
| 47 | 3-Chloropropyl Acrylate | 7 | | 10 | 3 | | 30 | | 10 | 2 | | | | | 120 | 298 |
| 48 | Sec.-Butyl Acrylate | 93 | .5 | 10 | 2 | 2 | 30 | 1 | | | | | | | 180 | 298 |
| 49 | 2-Chlorethyl Acrylate | 40 | .5 | 10 | 2 | 2 | 30 | 1 | | | | | | | 120 | 298 |
| 50 | Ethyl Acrylate | 160 | | 10 | 3 | | 30 | | 10 | 2 | | | | | 30 | 298 |
| 51 | $CH_2{:}CHCOOCH_2CH_2OCH_2Cl$ | 10 | .5 | 10 | 2 | 2 | 30 | 1 | | | | | | | 360 | 298 |
| 52 | Ethyl Acrylate | 190 | | 10 | 3 | | 30 | | 10 | 2 | | | | | 180 | 298 |

[1] The alphabetical characters shown hereunder have the following significance:
A—Purified mercaptobenzothiazole.
B—Zinc oxide.
C—Stearic acid.
D—Sulfur.
E—Carbon black.
F—Tetramethylthiuram disulfide.
G—Red lead.
H—Quinone dioxime.
I—Special furnace reinforcing black.
J—Polyac.
K—Triethylene tetramine.
L—Calcined magnesia.

TABLE X
*Preparation of ethyl acrylate-methyl vinyl ketone copolymers*

| Example No. | Monomers | | Emulsifiers | | Water, cc. | Catalyst—Ammonium Persulfate, pts. | Temp., °C. | Time, min. | Yield, Per Cent |
|---|---|---|---|---|---|---|---|---|---|
| | Ethyl Acrylate, pts. | Methyl Vinyl Ketone, pts. | Alkyl Sodium Sulfate, pts. | Aryl Sulfonate, pts. | | | | | |
| 53 | 90 | 10 | 0.75 | 1 | 200 | 0.005 | 80–90 | 60 | 88 |
| 54 | 95 | 5 | 0.75 | 1 | 200 | 0.005 | 81–91 | 60 | 92 |
| 55 | 760 | 40 | 7.5 | 10 | 1,400 | 0.040 | 81–91 | 75 | 89 |

TABLE XI
*Vulcanization of copolymers of Table X*

| Example No. | Copolymer | | Compounding Formula in Parts per 100 Parts of Copolymer [1] | | | | | | | | Vulcanization Time in min. at 298° F. |
|---|---|---|---|---|---|---|---|---|---|---|---|
| | Ethyl Acrylate, pts. | Methyl Vinyl Ketone, pts. | A | B | C | D | E | F | G | H | |
| 53 | 90 | 10 | 10 | 10 | 3 | 2 | 30 | | | | 60 |
| | 90 | 10 | | 10 | 2 | | 30 | 0.5 | 2 | 1 | 120 |
| 54 | 95 | 5 | | 10 | 2 | | 30 | 0.5 | 2 | 1 | 120 |
| | 95 | 5 | 10 | 10 | 3 | 2 | 30 | | | | 60 |
| 55 | 760 | 40 | | 10 | 2 | | 30 | 0.5 | 2 | 1 | 60 |

[1] The alphabetical characters shown hereunder have the following significance:
A—Red lead.
B—Zinc oxide.
C—Stearic acid.
D—Quinone dioxime.
E—Carbon black.
F—Mercaptobenzothiazole.
G—Sulfur.
H—Tetramethylthiuram disulfide.

TABLE XII

*Physical properties of vulcanizates of Table XI*

| Example No. | Tensile Strength, lbs./sq. in. | Elongation at Break, Percent | Shore A Hardness |
|---|---|---|---|
| 53 | 1,470 | 300 | 64 |
|  | 1,340 | 800 | 45 |
| 54 | 1,040 | 760 | 43 |
|  | 1,400 | 550 | 55 |
| 55 | 1,320 | 510 | 38 |

TABLE XV

*Physical properties of vulcanizates of Table XIV*

| Example No. | Tensile Strength, lbs./sq. in. | Elongation at Break, Per Cent | Shore A Hardness |
|---|---|---|---|
| 69 | 1,190 | 900 | 41 |
| 70 | 1,240 | 740 | 55 |
| 71 | 1,230 | 770 | 45 |
| 72 | 1,110 | 860 | 50 |
| 73 | 960 | 920 | 53 |
| 74 | 1,210 | 730 | 50 |
| 75 | 1,360 | 300 | 50 |
| 76 | 1,240 | 850 | 50 |
| 77 | 1,370 | 860 | 41 |
| 78 | 1,210 | 430 | 50 |
| 79 | 1,200 | 580 | 59 |
| 80 | 1,240 | 570 | 61 |
| 81 | 1,330 | 660 | 60 |
| 82 | 1,280 | 760 | 60 |

TABLE XIII

*Preparation of halogen-containing ethyl acrylate copolymers*

| Example No. | Ethyl Acrylate, pts. | Comonomers | pts. | Ammonium Persulfate, pts. | Temp., °C. | Time, min. | Yield, Percent |
|---|---|---|---|---|---|---|---|
| 56 | 90 | 2-chloropropene | 10 | 0.045 | 65–95 | 165 | 90 |
| 57 | 95 | 2-chloropropene | 5 | 0.025 | 64–96 | 75 | 92 |
| 58 | 95 | 2-chloropropene | 3 | 0.012 | 65–90 | 60 | 80 |
|  |  | chloropropylacrylate | 2 |  |  |  |  |
| 59 | 92 | 2-chloropropene | 3 | 0.010 | 79–90 | 75 | 93 |
|  |  | chloropropylacrylate | 4 |  |  |  |  |
|  |  | isoprene | 1 |  |  |  |  |
| 60 | 97 | 2-chloropropene | 2 | 0.005 | 80–89 | 50 | 89 |
|  |  | chloroallyl alcohol | 1 |  |  |  |  |
| 61 | 90 | chloroallyl alcohol | 10 | 0.015 | 82–90 | 60 | 89 |
| 62 | 95 | chloroallyl alcohol | 5 | 0.008 | 81–90 | 75 |  |
| 63 | 98 | chloroallyl alcohol | 2 | 0.010 | 80–93 | 135 | 87 |
| 64 | 90 | 2,3-dichloropropene | 10 | 0.038 | 76–94 | 135 | 93 |
| 65 | 95 | 2,3-dichloropropene | 5 | 0.027 | 73–96 | 120 | 85 |
| 66 | 80 | 2-chlorallyl pelargonate | 20 | 0.040 | 83–94 | 90 | 75 |
| 67 | 90 | 2-chlorallyl pelargonate | 10 | 0.020 | 81–92 | 20 | 90 |
| 68 | 95 | dichloro-n-propyl acrylate | 5 | 0.003 | 82–93 | 180 | 88 |

In each polymerization 200 parts of water, 1.5 parts of alkyl sodium sulfate and 0.5 part aryl sodium sulfonate were used per 100 parts of monomers.

TABLE XIV

*Vulcanization of halogen-containing acrylic copolymers*

| Example No. | Copolymer | Per cent | A | B | C | D | E | F | G | H | I | J | K | L | M | Vulcanization Time, Min. at 298° F. |
|---|---|---|---|---|---|---|---|---|---|---|---|---|---|---|---|---|
| 69 | Ethyl acrylate | 90 | 0.5 | 10 | 2 | 2 | 1 |  |  | 1 | 5 |  | 30 |  |  | 30 |
| 70 | 2-Chloropropene | 10 | 0.5 | 5 |  | 2 | 1 |  |  | 1 | 5 |  | 30 |  |  | 30 |
| 71 |  |  |  |  |  |  |  |  |  |  |  |  | 30 |  | 5 | 120 |
| 72 |  |  |  | 10 | 3 |  |  | 10 | 2 | 1–2 | 15 |  | 30 |  |  | 60 |
| 73 | Ethyl acrylate | 95 |  | 10 | 3 |  |  | 10 | 2 | 1 | 5 |  | 30 |  |  | 120 |
| 74 | 2-Chloropropene | 5 | 0.5 | 10 | 2 | 2 | 1 |  |  | 1 | 5 |  | 30 |  |  | 120 |
| 75 |  |  | 0.5 |  |  | 2 | 1 |  |  | 2 | 15 | 1 | 30 |  |  | 30 |
| 76 | Ethyl acrylate | 95 |  | 10 | 3 |  |  | 10 | 2 | 1 | 5 |  | 30 |  |  | 120 |
| 77 | 2-Chloropropene | 3 | 0.5 | 10 | 2 | 2 | 1 |  |  | 1 | 5 |  | 30 |  |  | 120 |
| 78 | Chloropropyl acrylate | 2 |  |  |  |  |  |  |  | 2 | 15 | 1 | 30 |  |  | 30 |
| 79 | Ethyl acrylate<br>2-Chloropropene<br>Chloropropyl acrylate<br>Isoprene | 92<br>3<br>4<br>1 | 0.5 | 10 | 2 | 2 | 1 |  |  | 1 | 5 |  | 30 |  |  | 60 |
| 80 | Ethyl acrylate<br>2-Chloropropene<br>Chloropropyl acrylate<br>Isoprene | 95<br>2<br>2<br>1 | 0.5 | 10 | 2 | 2 | 1 |  |  | 1 | 5 |  | 30 |  |  | 60 |
| 81 | Ethyl acrylate<br>2-Chloropropene<br>Chloropropyl acrylate<br>Isoprene | 93<br>3<br>3<br>1 | 0.5 | 10 | 2 | 2 | 1 |  |  | 1 | 5 |  | 30 |  |  | 60 |
| 82 | Ethyl acrylate<br>2-Chloropropene<br>Chloropropyl acrylate | 90<br>8<br>2 | 0.5 | 10 | 2 | 2 | 1 |  |  | 1 | 5 |  | 30 |  |  | 30 |

[1] The alphabetical characters shown hereunder have the following significance:
A—Purified mercaptobenzothiazole.
B—Zinc oxide.
C—Stearic acid.
D—Sulfur.
E—Tetramethylthiuram disulfide.
F—Red lead.
G—Quinone dioxime.
H—Triethylene tetramine.
I—Calcined magnesia.
J—Iron oxide.
K—Carbon black.
L—Polymerized di-nitroso benzene.
M—Magnesium phenyl stearate.

TABLE XVI

*Vulcanization of halogen-containing acrylic copolymers*

| Example No. | Copolymer | Per Cent | A | B | C | D | E | F | G | H | I | J | K | Vulcanization Time in Min. at 298°F. |
|---|---|---|---|---|---|---|---|---|---|---|---|---|---|---|
| 83 | Ethyl Acrylate / 2-chloropropene / Chloropropyl acrylate | 93 / 3 / 4 | 0.5 | 10 | 2 | 2 | 1 | — | — | 1 | 5 | — | 30 | 60 |
| 84 | Ethyl Acrylate / 2-chloroprene / Chloropropyl acrylate | 94 / 2 / 4 | 0.5 | 10 | 2 | 2 | 1 | — | — | 1 | 5 | — | 30 | 120 |
| 85 | Ethyl Acrylate / 2-chloropropene / Chloropropyl acrylate | 95 / 3 / 2 | 0.5 | — | — | 2 | 1 | — | — | 2 | 15 | — | 30 | 120 |
| 86 | | | 0.5 | — | — | 2 | 1 | — | — | — | 15 | 1 | 30 | 120 |
| 87 | | | 0.5 | — | — | 2 | 1 | — | — | 1-2 | 15 | 1 | 30 | 30 |
| 88 | Ethyl Acrylate / 2-chloropropene / 2-chloroallyl alcohol | 97 / 2 / 1 | 0.5 | 10 | 2 | 2 | 1 | — | — | 1 | 5 | — | 30 | 120 |
| 89 | Ethyl Acrylate / 2-chloroallyl alcohol | 90 / 10 | — | 10 | 3 | — | — | 10 | 2 | 1 | 5 | — | 30 | 30 |
| 90 | | | 0.5 | 10 | 2 | 2 | 1 | — | — | 1 | 5 | — | 30 | 30 |
| 91 | | | — | 10 | 3 | — | — | 10 | 2 | 1 | 5 | — | 30 | 30 |
| 92 | Ethyl Acrylate / 2-chloroallyl alcohol | 95 / 5 | — | 10 | 3 | — | — | 10 | 2 | 1 | 5 | — | 30 | 120 |
| 93 | | | 0.5 | 10 | 2 | 2 | 1 | — | — | 1 | 5 | — | 30 | 30 |
| 94 | | | 0.5 | 10 | 2 | 2 | 1 | — | — | — | — | — | 30 | 30 |
| 95 | Ethyl Acrylate / 2-chloroallyl alcohol | 98 / 2 | 0.5 | 10 | 2 | 2 | 1 | — | — | 1 | 5 | — | 30 | 120 |

[1] The alphabetical characters shown hereunder have the following significance:
A—Purified mercaptobenzothiazole.
B—Zinc oxide.
C—Stearic acid.
D—Sulfur.
E—Tetramethylthiuram disulfide.
F—Red lead.
G—Quinone dioxime.
H—Triethylene tetramine.
I—Calcined magnesia.
J—Iron oxide.
K—Carbon black.

TABLE XVIII

*Vulcanization of halogen-containing acrylic copolymers*

| Example No. | Copolymer | Percent | A | B | C | D | E | F | G | H | I | J | K | L | Vulcanization Time in Min. at 298°F. |
|---|---|---|---|---|---|---|---|---|---|---|---|---|---|---|---|
| 96 | Ethyl acrylate / 2,3-Dichloropropene | 90 / 10 | 0.5 | 10 | 2 | 2 | 1 | — | — | 1 | 5 | — | 30 | — | 60 |
| 97 | | | 0.5 | 10 | 2 | 2 | 1 | — | — | 1 | 5 | — | 30 | — | 120 |
| 98 | Ethyl acrylate / 2,3-Dichloropropene | 95 / 5 | 0.5 | — | — | 2 | 1 | — | — | 2 | 15 | 1 | 30 | — | 120 |
| 99 | | | — | — | — | — | — | — | — | 2 | 15 | 1 | 30 | — | 120 |
| 100 | | | — | 10 | 3 | — | — | 10 | 2 | 1 | 5 | — | 30 | — | 120 |
| 101 | | | 0.5 | 10 | 2 | 2 | 1 | — | — | 1 | 5 | — | 30 | — | 120 |
| 102 | | | 0.5 | — | — | 2 | 1 | — | — | 2 | 15 | 1 | 30 | — | 30 |
| 103 | Ethyl acrylate / 2,3-Dichloropropene | 97 / 3 | — | — | — | — | — | — | — | 2 | 15 | 1 | 30 | — | 120 |
| 104 | | | — | — | — | — | — | — | 1 | 2 | 10 | — | 30 | 3 | 60 |
| 105 | | | 0.5 | — | — | 2 | 1 | — | — | 1-2 | 15 | 1 | 30 | — | 60 |
| 106 | | | 0.5 | — | — | 2 | 1 | — | — | — | 15 | 1 | 30 | — | 30 |
| 107 | | | 0.5 | — | — | 2 | 1 | — | — | 2 | 15 | — | 30 | — | 120 |
| 108 | Ethyl acrylate / 2-Chloroallyl pelargonate | 80 / 20 | — | — | — | — | — | — | — | 2 | 15 | 1 | 30 | — | 30 |
| 109 | Ethyl acrylate / 2-Chloroallyl pelargonate | 90 / 10 | 0.5 | 10 | 2 | 2 | 1 | — | — | 1 | 5 | — | 30 | — | 60 |
| 110 | Ethyl acrylate / Dichloro-n-propyl acrylate | 95 / 5 | 0.5 | 10 | 2 | 2 | 1 | — | — | 1 | 5 | — | 30 | — | 120 |

[1] The alphabetical characters shown hereunder have the following significance:
A—Purified mercaptobenzothiazole.
B—Zinc oxide.
C—Stearic acid.
D—Sulfur.
E—Tetramethylthiuram disulfide.
F—Red lead.
G—Quinone dioxime.
H—Triethylene tetramine.
I—Calcined magnesia.
J—Iron oxide.
K—Carbon black.
L—Polymerized di-nitroso benzene.

TABLE XVII

*Physical properties of vulcanizates of Table XVI*

| Example No. | Tensile Strength, lbs./sq. in. | Elongation at Break, percent | Shore A Hardness |
|---|---|---|---|
| 83 | 1,200 | 730 | 45 |
| 84 | 1,280 | 530 | 47 |
| 85 | 1,560 | 230 | 60 |
| 86 | 1,280 | 580 | 49 |
| 87 | 1,200 | 340 | 46 |
| 88 | 930 | 820 | 50 |
| 89 | 2,020 | 110 | 84 |
| 90 | 1,670 | 130 | 82 |
| 91 | 1,400 | 160 | 70 |
| 92 | 1,710 | 270 | 71 |
| 93 | 1,220 | 230 | 60 |
| 94 | 1,420 | 710 | 40 |
| 95 | 1,165 | 690 | 55 |

TABLE XIX

*Physical properties of vulcanizates of Table XVIII*

| Example No. | Tensile Strength, lbs./sq. in. | Elongation at Break, Per Cent | Shore A Hardness |
|---|---|---|---|
| 96 | 80 | 1,100 | 31 |
| 97 | 120 | 1,100 | 40 |
| 98 | 380 | 900 | 34 |
| 99 | 1,120 | 640 | 44 |
| 100 | 1,030 | 620 | 50 |
| 101 | 980 | 1,100 | 40 |
| 102 | 1,020 | 220 | 59 |
| 103 | 1,340 | 450 | 45 |
| 104 | 1,160 | 480 | 46 |
| 105 | 1,100 | 550 | 44 |
| 106 | 1,410 | 200 | 56 |
| 107 | 1,400 | 500 | 47 |
| 108 | 1,230 | 630 | 39 |
| 109 | 980 | 510 | 57 |
| 110 | 430 | 1,100 | 43 |

Having thus described our invention, we claim:

1. A process of preparing a synthetic rubber comprising compounding a copolymer prepared from a mixture containing, as monomeric components, alkyl acrylate and methyl vinyl ketone in the proportion of from 80 to 98 percent of acrylate to at least 2 percent of the ketone, with sulfur and heating the compounded mixture to effect vulcanization.

2. A process of preparing a synthetic rubber comprising compounding a copolymer prepared from a mixture containing, as monomeric components, alkyl acrylate and methyl vinyl ketone in the proportion of from 80 to 98 percent of acrylate to at least 2 percent of the ketone, with a vulcanizing agent selected from the group consisting of sulfur and the combination of quinone dioxime and red lead, and heating the compounded mixture to effect vulcanization.

WILLIAM C. MAST.
CHESSIE E. REHBERG.
CHARLES H. FISHER.

REFERENCES CITED

The following references are of record in the file of this patent:

UNITED STATES PATENTS

| Number | Name | Date |
|---|---|---|
| 1,121,134 | Rohm | Dec. 15, 1914 |
| 2,105,361 | Nowak | Jan. 11, 1938 |
| 2,324,935 | Kautter et al. | July 20, 1943 |
| 2,405,008 | Berry et al. | July 30, 1946 |
| 2,416,878 | Lindsey et al. | Mar. 4, 1947 |
| 2,419,221 | Kenyon et al. | Apr. 22, 1947 |
| 2,442,330 | Fuller | June 1, 1948 |
| 2,451,174 | Reuter | Oct. 12, 1948 |
| 2,492,170 | Mast et al. | Dec. 27, 1949 |

FOREIGN PATENTS

| Number | Country | Date |
|---|---|---|
| 498,383 | Great Britain | Jan. 3, 1939 |

OTHER REFERENCES

Mast et al.: "Vulcanization of Saturated Acrylic Resins," article in Ind. Eng. Chem., vol. 36, pages 1022–1027 (November 1944).